Nov. 10, 1953 W. M. SCHLITT 2,658,309
PLANT BASKET REMOVING IMPLEMENT
Filed Sept. 27, 1949
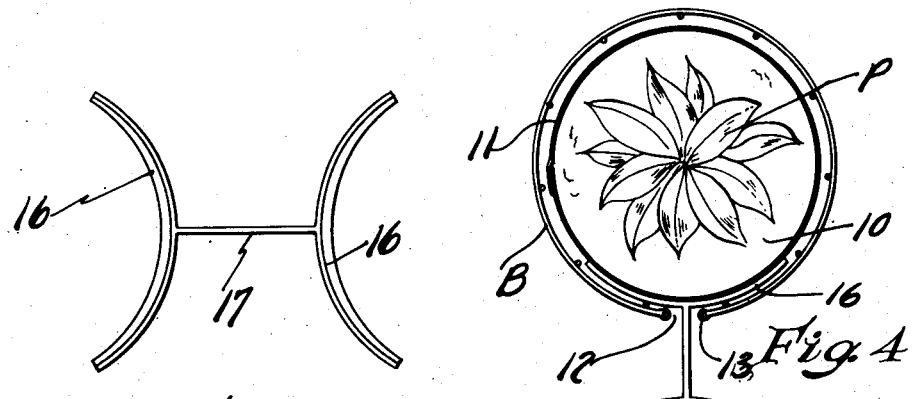
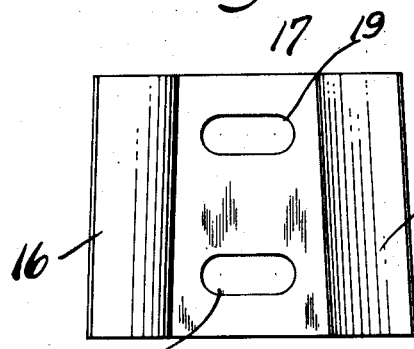
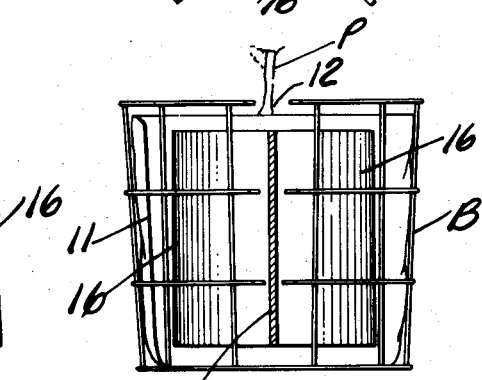
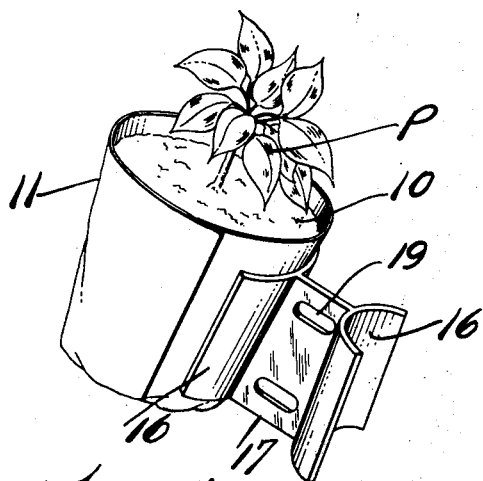
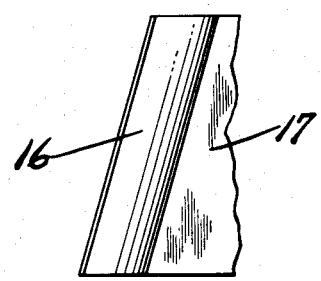
INVENTOR.
William M. Schlitt
BY
Frank C. Fearman
ATTORNEY Patented Nov. 10, 1953

2,658,309

UNITED STATES PATENT OFFICE 2,658,309

PLANT BASKET REMOVING IMPLEMENT

William M. Schlitt, Bay City, Mich.

Application September 27, 1949, Serial No. 118,109

6 Claims. (Cl. 47—37)

This invention relates to plant basket removing implements for supporting the earthed portions of the larger plants while removing the baskets in which they have been potted, and is adapted for use in nurseries and the like.

As is well kown in the nursery art, it is necessary to remove plants from the field when they reach a certain size and/or stage of growth and place them in dirt-filled containers where they continue to grow until such time as they are sold or otherwise disposed of, whence they are removed from the container and transported to desired location.

In the art as usually practiced wire baskets of large mesh and varying sizes having a heavy asphalt felt loosely wrapped around the balled root are utilized as the containers. These wire baskets are split down one side, and eyelets or other readily separable means are provided on the split ends so that said ends may be easily connected by the insertion of a pin and also quickly and easily disengaged by simply removing the pin.

In former practice at the time of purchase, a brick was placed near the basket bottom to serve as a weight to aid in tilting, and when the basket was opened a shovel or other implement was placed between the wire basket and the asphalt felt to support the balled root portion of the plant. This was then tilted while the basket was kicked free so that the customer could be given the asphalt felt wrapped plant. This method was slow and awkward and the use of the unsuitable and unwieldy shovel or other implement often resulted in the crumbling and breaking away of the earth around the roots; consequently, the roots were exposed to atmosphere and the life of the plant endangered.

It is therefore the prime object of my invention to provide an implement which is so designed and constructed as to obviate these readily apparent difficulties with the result that the use of the brick and shovel becomes unnecessary and the plants are supported by a specially formed implement including pitched and curved cradle sections which smoothly accommodate the balled earth and root portion of the plant.

A further object of my invention is to provide a very simple, practical and handy implement of the type described which can be easily utilized and economically manufactured.

A further object of my invention is to provide an implement which has a certain degree of flexibility in that different sizes of baskets can be handled by each implement, it being obvious that any desired combination of basket sizes could be handled by a single unit.

Other objects and advantages of my invention will become apparent as the specification progresses, it being obvious that various changes can be made in the size, shape and arrangement of parts, without departing from the spirit of the invention or the scope of the appended claims.

In the drawing:

Fig. 1 is a side-elevational view showing one form of my plant-transferring implement.

Fig. 2 is a top, plan view thereof.

Fig. 3 is a side-elevational view showing the end sections of the wire basket disconnected and one arcuate plate interposed between the basket and the plant, the connecting plate of the implement being shown in section.

Fig. 4 is a top, plan view illustrating the assembly shown in Fig. 3.

Fig. 5 is a perspective elevational view showing a plant on the implement.

Fig. 6 is a fragmentary, side-elevational view of the implement showing pitched plates.

Referring now more particularly to the accompanying drawing in which there is shown a potted plant P having a balled earth and root section 10 around which a sheet of asphalt felt 11 is wrapped to form a covering which holds the earth around the plant's roots.

A wire basket B, of reasonably large mesh, surrounds the wrapped balled portion of the plant and is split as at 12, the ends of the wire loops being formed with eyes 13 which when placed in vertical register with the eyes on the opposite edges, freely accommodate a pin (not shown), said pin having a head to limit downward movement and facilitate the insertion and removal thereof.

The implement proper comprises a pair of opposed laterally spaced-apart, concave-convex plates 16 of arcuate cross section suitably connected by means of a division plate 17 which can be welded to or cast integral with the arcuate plates 16. Openings 19 which serve as handholds are provided in said plate to facilitate handling thereof, these plates being slightly pitched as shown so that when in use the plants are cradled in the implement, the area of the arcuate-shaped plates being sufficiently large so that there is no crumbling of the balled earth or cracking loose of segments of said ball, the felt, of course, forming a firm binder.

In practice, the pin (not shown) is pulled from the basket eyelets 13, permitting the ends of the basket to swing apart and provide a gap or space between the asphalt felt covering 11 (in which the plant P is wrapped) and the basket, all as clearly shown in Fig. 4 of the drawing. The implement is then inserted in position from the top, the section 17 being accommodated in the gap or space between the free ends of the wire basket. In this position, the face of the one section 16 rests snugly against the cylindrical surface of the balled portion of the plant P.

With the implement in the above-described position, the entire assembly, basket and implement, is tilted, the user having one hand in the hand opening 19 and his other hand grasping the upper far edge or rim of the basket. The assembly is then tilted until the lower edge of the non-engaged section 16 engages the ground to serve as a fulcrum. When the angle of tilt is sufficient to support the plant and prevent its slipping therefrom, the workman kicks the basket free, after which the implement and plant are swung back to original, upright position, one hand grasping the upper far edge of the asphalt wrapped plant to prevent its sliding off the implement until the plant is in its upright position supported on the ground. A cord (not shown) can then be tied around the asphalt paper wrapped portion of the plant, and it is then ready for delivery to a customer.

The implement is usually formed with arcuate sections of different size so that one implement can be used with several sized plants, the section used depending on the size of the balled portion of the plant.

In Fig. 6 of the drawing I have shown a modification of my invention in which one of the arcuate surfaces 15 is positively pitched to conform to the cone-shaped sides of larger wire basket B; however, this in no manner changes the spirit of the invention.

From the foregoing description, it will be apparent that I have perfected a very simple, practical and convenient implement for handling plants of all kinds.

What I claim is:

1. A one-piece plant handling implement for insertion in a separable wire basket, in which a plant and balled earth is contained, said implement comprising opposed, laterally spaced-apart concave-convex sections arcuately shaped in cross section, one of said sections being insertable in the basket between the basket and balled earth, and adapted, when tilted to inclined position, to support the plant thereon and permit free removal of said basket, a division plate connecting said opposed convex faces of the sections, and openings in said division plate to facilitate handling of said implement.

2. A one-piece, rigid plant handling implement for insertion in a separable wire basket in which a plant having balled earth surrounding its roots is disposed, said implement comprising opposed, laterally spaced-apart concave-convex sections arcuately shaped in cross section, a division member provided with handhold means connecting the opposed convex faces of the sections, one of said sections being insertable in the separable basket between the basket and balled earth to support the plant when the basket is tilted about the opposite section as a fulcrum to permit the basket to be freely removed.

3. A rigid plant handling implement for insertion in a separable wire basket in which a plant having balled earth surrounding its roots is disposed, said implement comprising opposed, laterally spaced concave-convex sections arcuately shaped in cross section, a division plate connecting the opposed convex faces of the sections, one of said sections being pitched and insertable in the basket between the basket and balled earth and adapted when the basket is tilted to inclined position to support the plant thereon and permit free removal of said basket.

4. A one-piece, rigid plant handling implement for insertion in a separable wire basket in which a plant having balled earth surrounding its roots is disposed, said implement comprising opposed, laterally spaced-apart sections each having an outer concave balled earth-engaging face, a division member provided with handhold means connecting the faces of said sections opposite said concave faces, one of said sections being insertable in the separable basket between the basket and balled earth to support the plant when the basket is tilted about the opposite section as a fulcrum to permit the basket to be freely removed.

5. A rigid, one-piece implement for handling plants having balled earth surrounding their roots, the implement being adapted for insertion in a separable wire basket containing the plant, comprising a concave-convex section substantially arcuately shaped in cross section, handhold means extending laterally from the convex face of said section, said section over its entire concave surface substantially conforming to the circumference of the balled earth portion of the plant when the implement is inserted in the separable basket between the basket and balled earth, said section supporting the plant when the basket is tilted about the handhold means as a fulcrum to permit the basket to be freely removed.

6. A rigid, one-piece implement for handling plants having balled earth surrounding their roots, the implement being adapted for insertion in a separable wire basket containing the plant, comprising, a section having a concave balled earth engaging face, handhold means extending laterally from the face of said section opposite said concave face, said section over its entire concave surface substantially conforming to the circumference of the balled earth portion of the plant when the implementt is inserted in the separable basket between the basket and balled earth, said section supporting the plant when the basket is tilted about the handhold means as a fulcrum to permit the basket to be freely removed.

WILLIAM M. SCHLITT.

References Cited in the file of this patent

UNITED STATES PATENTS

| Number | Name | Date |
|---|---|---|
| 879,613 | Edwards | Feb. 18, 1908 |
| 1,856,016 | Armstrong | Apr. 26, 1932 |

FOREIGN PATENTS

| Number | Country | Date |
|---|---|---|
| 260,203 | Germany | May 22, 1913 |
| 355,124 | Great Britain | Aug. 20, 1931 |